May 2, 1961 G. K. C. HARDESTY 2,982,039
COMPATIBLE ELECTROLUMINESCENT-INCANDESCENT PANEL DISPLAY
Filed Sept. 30, 1958 4 Sheets-Sheet 1

*INVENTOR.*
G. K. C. HARDESTY
BY
ATTORNEYS.

INVENTOR.
G. K. C. HARDESTY
BY
ATTORNEYS.

2,982,039

COMPATIBLE ELECTROLUMINESCENT-INCANDESCENT PANEL DISPLAY

George K. C. Hardesty, Box 156, Mayo, Md.

Filed Sept. 30, 1958, Ser. No. 764,462

2 Claims. (Cl. 40—130)

(Granted under Title 35, U.S. Code (1952), sec. 266)

The invention described herein may be manufactured and used by or for the Government of the United States of America for governmental purposes without the payment of any royalties thereon or therefor.

This invention relates to the illumination of instrument dials, panels, plotting boards and the like, and particularly to the provision of an efficient and practical edge-illuminated panel which is suited for many uses aboard ships, surface or submarine, aircraft and in other installations having large numbers of visual indicators.

More particularly, this invention relates to edge lighting in combination with electroluminescent sources and alternate and optional tungsten filament light sources.

Heretofore, edge lighting, that is, panel illumination wherein one or more light sources are located at the edge of a transparent panel and light rays introduced into the panel for transillumination thereof and indirect illumination thereby, has been carried out more or less exclusively by tungsten filament lamps, fluorescent lamps or the like located at the edge of the panel; hence the name edge lighting.

Electroluminescence, on the other hand, has been used only for direct illumination. That is, pointers, indicia or the like are either formed as electroluminescent members or are located directly in front of electroluminescent members for direct illumination thereby.

Tungsten filament lamps and electroluminescent light sources each have certain inherent advantages and disadvantages. For example, for panel illumination, 6 volts is a practical maximum that may be used for the miniature lamps required. Such tungsten filaments are rich in red light and they emit appreciable light through the several bands of the visible spectrum at this conservative voltage, and such lamps have a relatively long life. However, as tungsten filaments are dimmed, either by design or through age, the other bands of the visible spectrum disappear and substantially only red light is emitted. Electroluminescent light sources, on the other hand, operate most efficiently at around 250 volts. Electroluminescent sources can efficiently emit light rays from orange-yellow through blue, with practically no emission of red rays. The color characteristics of light rays emitted by an electroluminescent source, however, do not appreciably change with dimming.

In various military installations, as described in detail hereinatfer, it is highly desirable, if not imperative, that the light source of an illuminated panel be capable of emitting light rays, whether bright or dim, throughout the entire visible spectrum. In an edge-lighted plotting board for example, it is necessary that the range rings, bearing lines and the numerals, which are permanently applied to the reverse side of the transparent panel, be in distinctly different colors, and it is necessary that the temporary plotting markings, whether they be by grease pencils, pressure-sensitive adhesive tabs, or small suction cups, also be in distinctly different colors, readily distinguishable at a glance from each other and from the permanent markings.

Applicant has discovered that by combining the desirable features of tungsten filament light sources with those of electroluminescent sources a synergetic effect is produced. Applied to a plotting board, for example, light rays from both tungsten filament sources and from electroluminescent sources are introduced into the transparent, light-transmitting panel for transilluminaion of such panel. The different light sources are so arranged relative to the light-transmitting panel that they may be used separately or in combination. That is, for installations where the tungsten filament source will do the job alone, as where only the red range of the spectrum is needed, only the tungsten source is energized; where the electroluminescent source will do the job alone, as where the blue through orange-yellow range of the spectrum is needed, only the electroluminescent source is energized; and where the entire visible spectrum is required, both the tungsten source and the electroluminescent source are energized. When both sources of light are energized, the transparent panel is transilluminated by a substantially white light, which white light may be separated into its various distinctly color components as desired, as pointed out in detail hereinafter.

An object of the present invention is to provide an efficient and practical illuminated panel in the nature of an edge-illuminated panel.

A further object of this invention is to provide an illuminated panel utilizing electroluminescent sources for indirect lighting.

A further object of this invention is to provide an illuminating panel combining desirable features of electroluminescent lamps with desirable features of tungsten lamps.

The broad principles of this invention may be applied to edge-lighted plotting boards and to "see thru" transparent illuminated scales, dials, pointers and the like.

Briefly, this invention facilitates the viewing of non-electroluminescent indicia and other graphic material made luminous by light given off by concealed electroluminescent sources applied to suitable hidden surfaces of a transparent, light-conducting panel and alternatively capable of supplementary or optional illumination from tungsten lamps, or the like, applied in a complementary edge lighting relationship.

By this invention, the utility of electroluminescent lamps in instrument illumination is greatly extended, since it is not necessary that the electroluminescent material itself be viewed. The indicia or markings, for example, may be of suitable, high diffuse reflectivity, opaque or translucent, materials chosen for excellent daylight visibility as well as high apparent luminosity when viewed at night or in dark environments. The applied indicia may be any color or reflectivity paint, fired on composition, or the like, or the Corning Glass Works type of photo-sensitive graphic technique may be used.

The instant invention may be used with a single panel illumination system and it is compatible with and may be used with the Duo-Panel System Edge Illumination System, illustrated and described in applicant's co-pending patent application Serial No. 369,976, filed July 23, 1953, now U.S. Patent No. 2,886,911.

The invention, together with the above and other objects and advantages thereof, is set forth in more technical detail in the following description when considered in connection with the accompanying drawing wherein like reference numerals designate like parts throughout the several views thereof and wherein.

Figure 1:
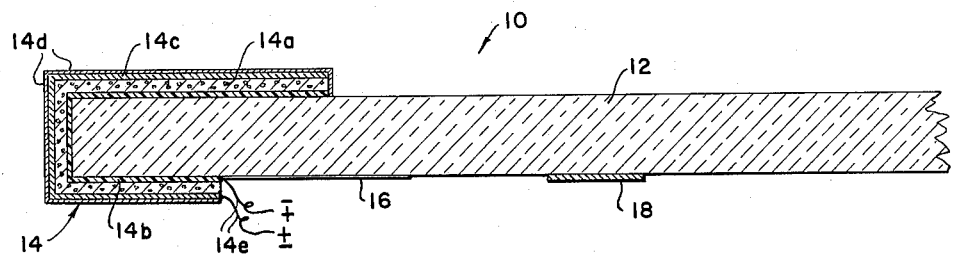
Fig. 1 is a fragmentary sectional view of an illuminating panel illustrating one embodiment of the present invention as applied to a "see thru" or single panel system.

Referring now to Fig. 1 of the drawing wherein a first embodiment of the invention is shown in simplified form applied to a fragment of a single panel of an illuminated indicator particularly adapted for use aboard ships, aircraft, or the like. The indicator, designated generally by reference numeral 10, includes a panel or light-transmitting member 12 made of glass or a highly transparent plastic. The light-transmitting panel 12 comprises a relatively flat highly transparent plate, having its front and back surfaces in parallel relation to each other and preferably polished to provide smooth optical surfaces. The light-transmitting member 12 is preferably fabricated from an acrylic resin or methyl methacrylate plastic material of the thermoplastic type such as, for example, commercial "Plexiglas" or "Lucite." The boundary surfaces of panel 12, including the major front and back surfaces are polished for high specular reflectivity.

A laminated border or framework of electroluminescent material, indicated generally by reference numeral 14 is placed around the periphery of panel 12. Electroluminescent material, per se, is well-known in the art and need not be described in detail here. For purpose of illustration, the lamination 14 comprises a layer 14a of electroluminescent material such as phosphor granules embedded in a transparent plastic or glass matrix, and sandwiched between a transparent electrical conductor 14b and an opaque electrical conductor 14c, with the outer or exposed surfaces covered with a sealing and protecting coating 14d. A pair of leads 14e are connected to conductors 14b and 14c and lead to and from a suitable source of A.C. current, not shown. As shown in Fig. 1, the transparent conductor 14b, which may be formed of tin oxide, faces the light-transmitting panel 12 and it may or may not be in optical contact with such panel, as desired. The opaque conductor 14c is preferably of a polished metal having good light reflecting properties.

In accordance with the Fig. 1 embodiment of the invention, the electroluminescent material is used as the only light source. The lamination 14 functions as a frame for the panel and it utilizes a part of the panel that would otherwise be wasted insofar as illumination is concerned; this portion of the panel being generally located within a cabinet or casing, not shown.

For "see thru" panels, so as to prevent disturbing reflections at the front or obverse surface of the panel, a coating 16 of a light-absorbing dye is incorporated in the rear surface of the light-transmitting panel adjacent the electroluminescent material. The extent of the light-absorbing dye is dependent upon the use of the panel and, in some applications, the electroluminescent material may be omitted from the rear surface of the light-transmitting panel and in its place such surface may be covered with the light-absorbing dye.

With the arrangement shown in Fig. 1, light introduced into the light-transmitting panel 12 from the electroluminescent material is transmitted through the panel by internal reflection in the manner of edge lighting and such light may be tapped off as desired. For purpose of illustration, an indicia 18 is placed in optical contact with the rear surface of the light-transmitting panel, which indicia is thereby rendered luminous and viewable through the panel from the front surface thereof. The indicia may be located on the front or back surface of the panel, as desired, and, since the electroluminescent source of light is itself not viewable, the indicia or other markings may be of suitable, color, high diffuse reflectivity, opaque or translucent, materials chosen for excellent daylight visibility as well as high apparent luminosity when viewed at night or in a dark environment. When the indicia are placed on the front surface of the panel, light-diffusing means may be placed on the rear surface of the panel directly opposite the indicia in the manner illustrated and described in the U.S. patent to Hardesty No. 2,795,069, June 11, 1957.

In the Fig. 1 embodiment of the invention, as stated above, electroluminescent material is the only source of light. However, with this single panel embodiment, the electroluminescent source of light may be used in combination with and be complemented by one or more tungsten filament lamps in much the same manner for example, as described hereinafter in connection with the duo-panel system of the Fig. 2 embodiment.

Figure 2:
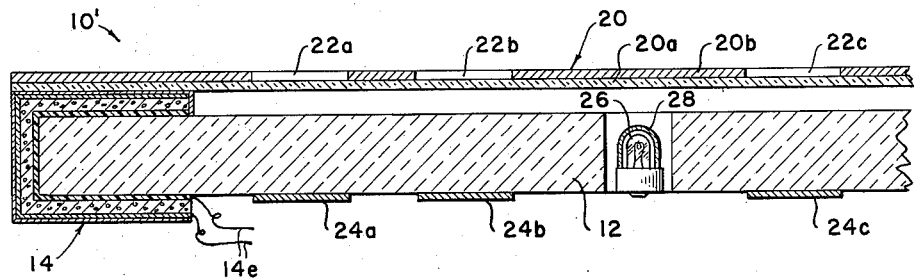
Fig. 2 is a fragmentary section similar to Fig. 1 and illustrating an application of the present invention to a duo-panel system.

Referring now to Fig. 2 of the drawing, wherein there is shown a second embodiment of the invention applied to a duo-panel system. In this embodiment, the light-transmitting panel 12 is the same as that of the Fig. 1 embodiment and it is framed by an electroluminescent lamination 14. With the Fig. 2 embodiment, an indicia panel 20 is mounted in front of the light-transmitting panel and is optically separated therefrom, as for example, by the lamination 14 on the upper surface of the light-transmitting panel. The indicia panel is formed by a lower lamina 20a and an upper lamina 20b. The upper lamina is formed preferably of opaque material and is provided with openings therein that expose areas of the lower lamina, three of which openings are shown at 22a, 22b and 22c. The lower lamina may be of any suitable material, transparent or translucent as desired. Light-diffusing means are located on the lower surface of the light-transmitting panel opposite the openings or indicia on the indicia panel; three such light diffusing means, such as white paint patches are shown at 24a, 24b and 24c on the reverse or rear surface of panel 12.

In accordance with the instant invention, with the combination of electroluminescent and tungsten filament light sources, the indicia panel, the indicia and the light diffusing means may be variously changed to fit current necessities. For example, the openings 22a, 22b and 22c may form the indicia, with the panel 20a formed of translucent material and the diffuse patches 24a, 24b and 24c of a white paint; or, the openings 22a, 22b and 22c may be of the general configuration of the indicia, the panel 20a of transparent material and the diffuse patches 24a, 24b and 24c may form the indicia and be of any desired color.

Figure 7:
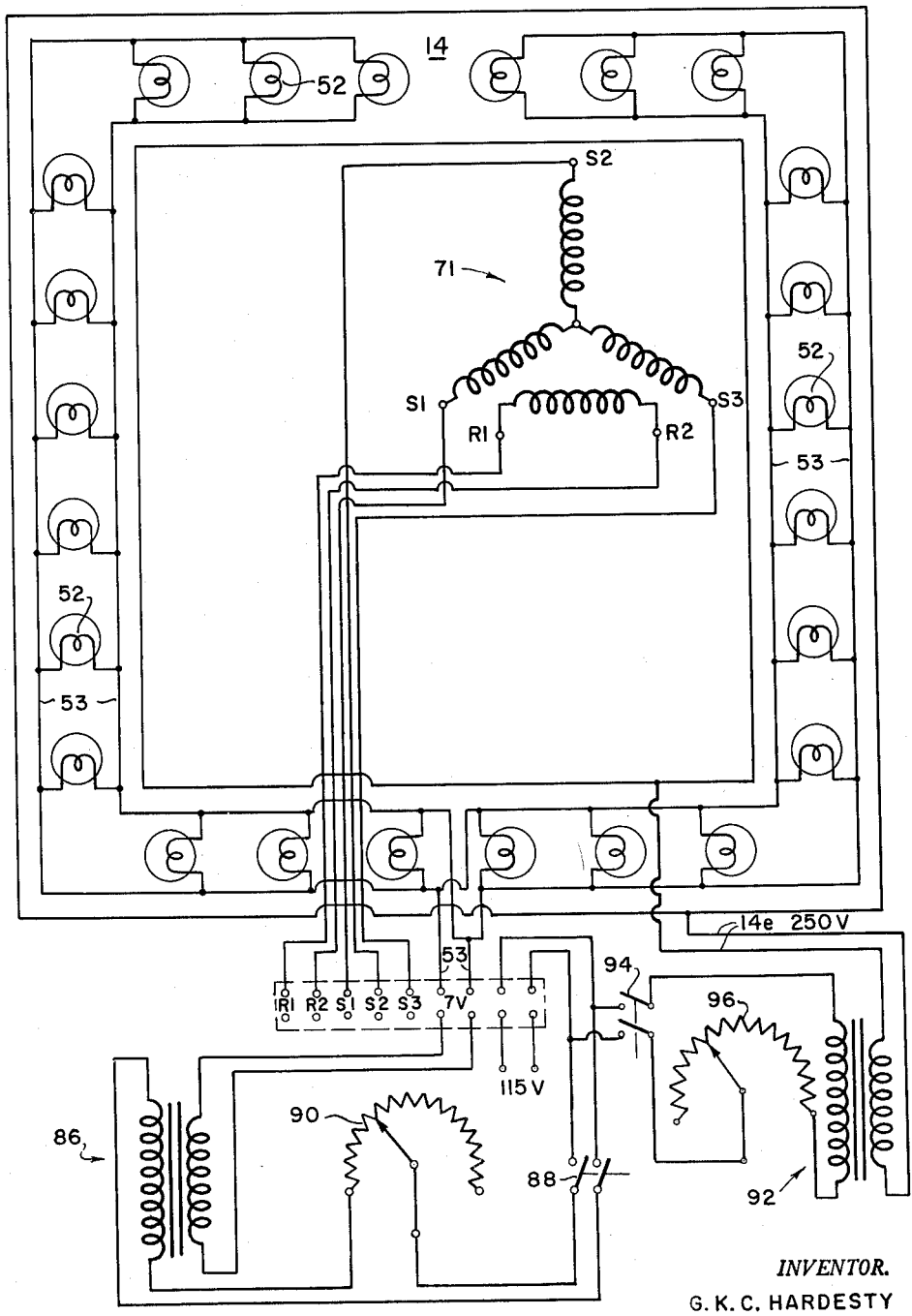
Fig. 7 is a wiring diagram for the light sources for the plotting board shown in Figs. 4–6.

In accordance with the Fig. 2 embodiment of the invention, one or more tungsten filament lamps 26 is located within an opening or openings in the light-transmitting panel for directing light rays into such panel for transmission therethrough. The tungsten lamp is preferably provided with a filter element 28. The electroluminescent light source and the tungsten lamp or lamps may be used in combination or separately, as desired, for different purposes. One such use of the two light sources in combination is in installations where the characteristics of electroluminescent light source is highly desirable and still filtered light, such as distinct red light, is needed, and, since satisfactory red light is not obtainable from an electroluminescent source, a tungsten lamp or the like complements and combines with the electroluminescent source in providing a more versatile panel. One source, the tungsten lamp, may be used for the red color range of the spectrum; the other, electroluminescent, for the blue through orange-yellow range. One may be used for daylight; the other for night or dark environments. Also, for certain installations, the two sources may be connected to separate and distinct sources of power. The different sources of light may be connected to a power source or sources in any suitable manner, not shown, but may be as illustrated in Fig. 7, to be referred to in detail hereinafter.

Figure 3:
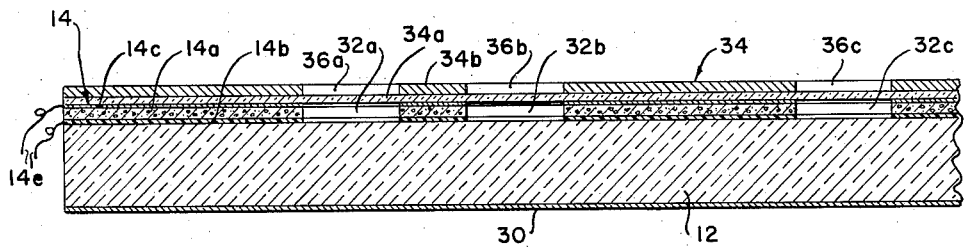
Fig. 3 is a fragmentary sectional view illustrating a modification of the invention applied to a duo-panel system.

Fig. 3 illustrates a modification of the duo-panel embodiment illustrated in Fig. 2. Referring now to Fig. 3, the light-transmitting panel 12 is again fabricated of highly transparent material such as glass or, preferably, an acrylic resin or methyl methacrylate plastic, with the front and back surfaces of the panel in parallel relation and polished to provide smooth optical surfaces. The back or reverse surface of the light-transmitting panel is preferably covered throughout its area with a material having high specular reflectivity. This material, indicated at 30, may be polished-faced metal foil, polished metal sheets, evaporated metal deposited on the surface as a film, or oriented flake metallic-pigmented coatings. The front surface of the light-transmitting panel is covered throughout its area with an electroluminescent light source, indicated generally at 14. The electroluminescent material of the Fig. 3 embodiment is the same as the Fig. 2 embodiment and includes a transparent current carrying lamina 14b, and electroluminescent lamina 14a and an opaque lamina 14c. The electroluminescent light source is provided with optionally-placed openings therein for transmission of light therethrough, which openings are indicated at 32a, 32b and 32c.

Mounted in front of the light-transmitting panel is an indicia panel 34. The indicia panel comprises a lower lamina 34a made of transparent or translucent plastic, as desired, and an upper lamina 34b made of an opaque material. Indicia-forming openings 36a, 36b and 36c are cut in the upper or opaque lamina and are in line with the openings 32a, 32b and 32c formed in the electroluminescent light source. With the Fig. 3 arrangement, light rays from the electroluminescent source are transmitted through the upper surface of the light-transmitting panel and into the panel at various angles for transmission therethrough. Certain of such light rays are reflected by the mirrored surface 30 back through the openings 32a, 32b and 32c in the light source to thereby illuminate the indicia formed by the openings 36a, 36b and 36c in the opaque lamina 34b. Thus, as with the other embodiments, the indicia are indirectly illuminated by an electroluminescent source which itself is not seen. If desired, the indicia may be colored inserts in the openings 36a, 36b and/or 36c.

Figure 4:
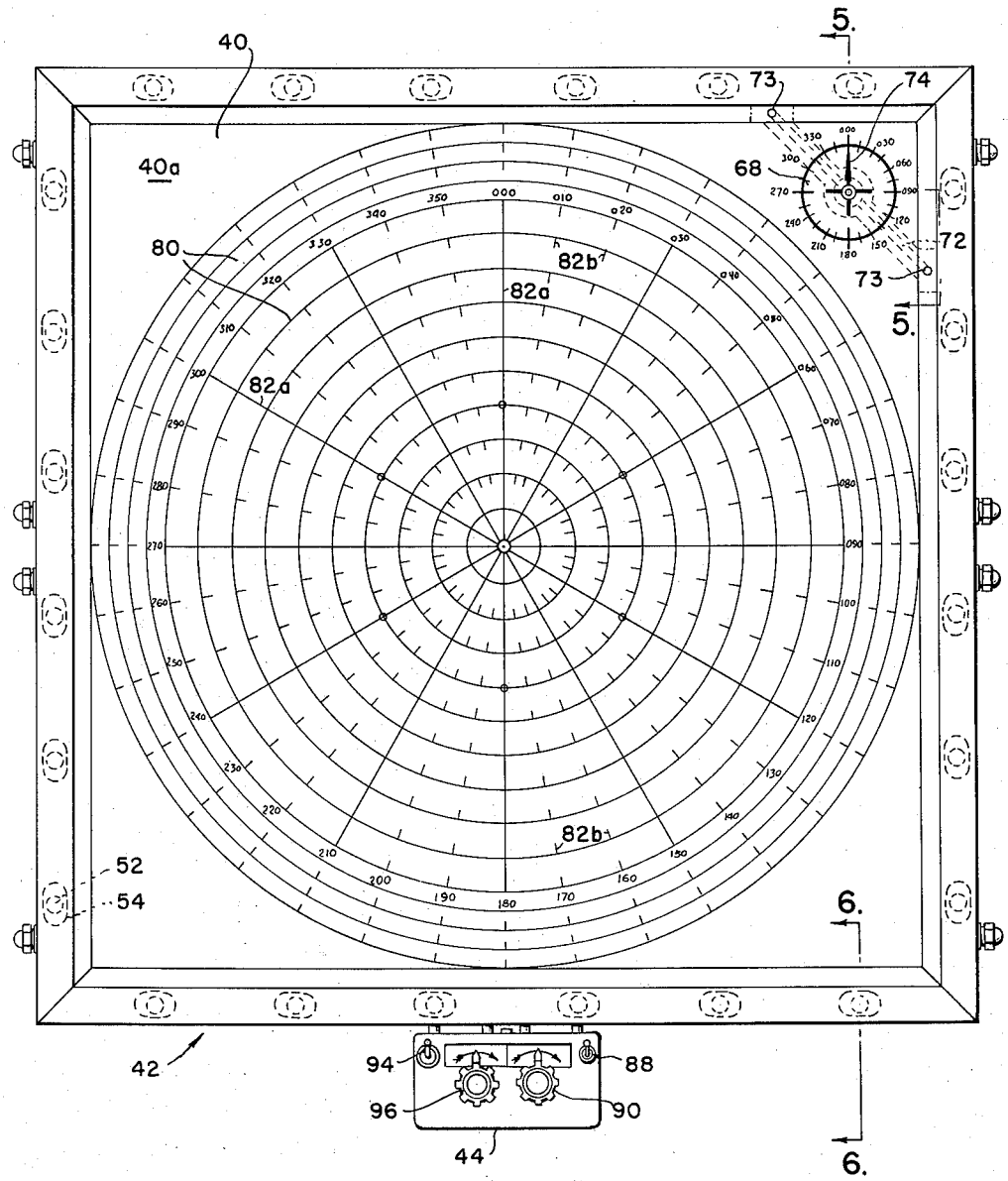
Fig. 4 is a front elevational view illustrating the invention applied to a plotting board.
Figures 5, 6:
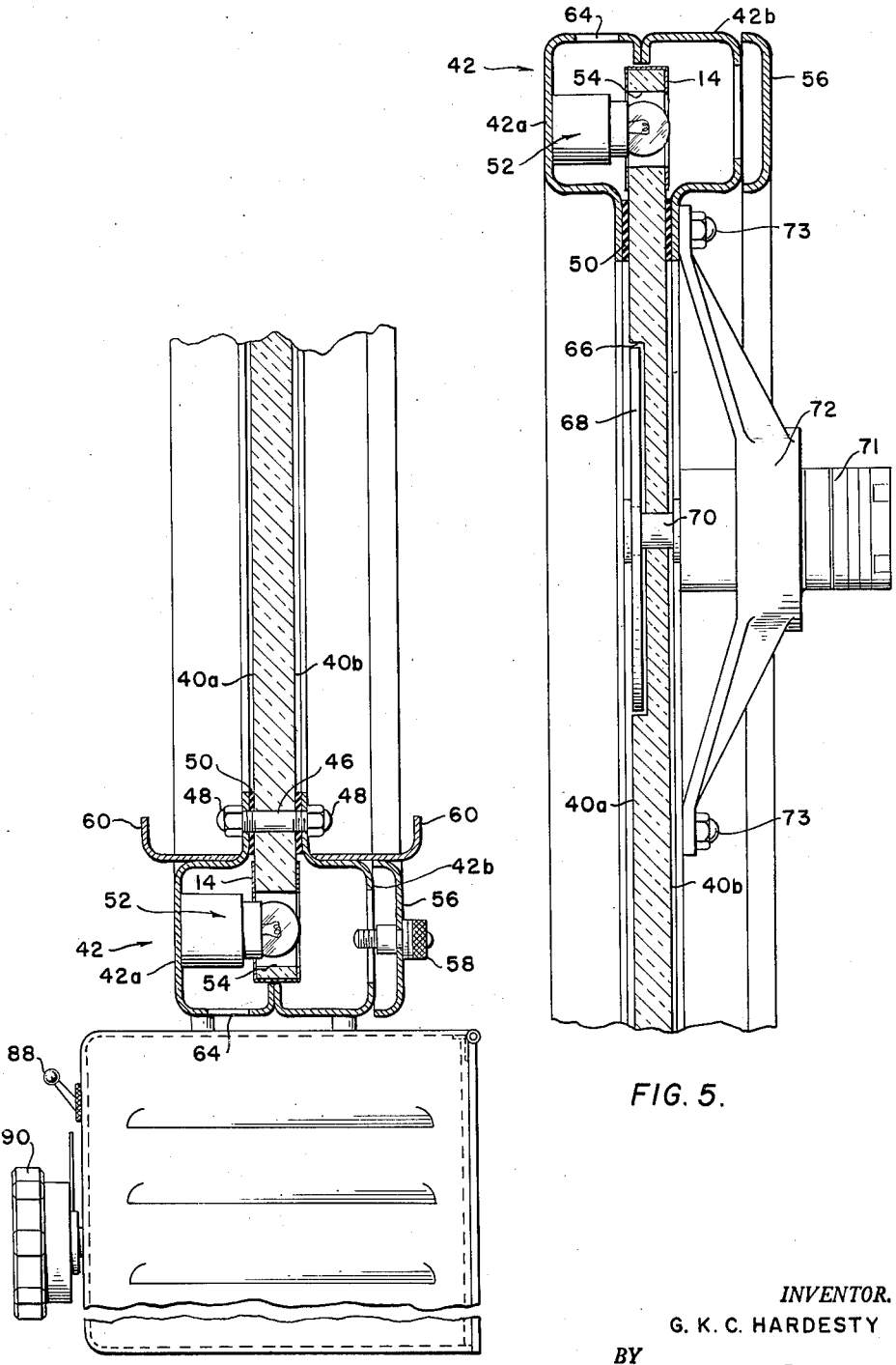
Fig. 5 is a partial sectional view taken substantially on line 5—5 of Fig. 4.
Fig. 6 is a partial sectional view taken substantially on line 6—6 of Fig. 4.

In Figs. 4-7 there is illustrated a practical embodiment of the invention applied to an edge-lighted, vertical plotting board. As pointed out hereinbefore, Fig. 5 is a front elevational view of the plotting board and Figs. 5 and 6 are vertical sections taken on lines 5—5 and 6—6 of Fig. 4, looking in the direction of the arrows. Fig. 6 is really a continuation of Fig. 5, with intermediate portions of the board omitted for clarity of illustration. The plotting board, known in the art as a 60 inch-vertical plotting board, in that it provides a vertical surface sixty inches square for plotting, is not per se applicant's invention and is used here as another illustration of the versatility of applicant's invention.

Referring now to Figs. 4-6, the plotting board comprises a square light-transmitting panel 40, fabricated of highly transparent plastic, such as an acrylic resin or methyl methacrylate and having its front and back surfaces 40a and 40b parallel and polished to provide smooth optical surfaces. The board is mounted in a square frame or housing, indicated generally by reference numeral 42, comprising front and rear channel members 42a and 42b. A control box 44 is suspended from the lower center portion of the frame. The plotting board is secured to the frame members by a plurality of studs 46 having acorn nuts 48 on opposite ends thereof and with gaskets 50 between the frame members and the front and back surfaces of the light-transmitting panel. The frame with the plotting board mounted therein is supported in a vertical position by suitable supports, not shown.

As shown in Figs. 5 and 6, and in dotted lines in Fig. 4, each of the four sides of the frame houses six, 6 volt, 3 candle power tungsten lamps, indicated generally by reference numeral 52. The lamps protrude through clearance holes 54, provided in the light-transmitting panel near the edges thereof and within the frame, in order to properly align the lamp filament for optimum edge lighting effect. The lamps are accessible for replacement by removing a lamp cover plate 56, which cover plate is secured to the rear frame member by a plurality of studs 58. A chalk tray 60 extends along the bottom of the board at the front and rear thereof.

In accordance with this invention, the light-transmitting panel is provided with an electroluminescent light source along its marginal edges. This light source, indicated by reference numeral 14, is generally similar to that illustrated in Fig. 2 in that it includes an electroluminescent material sandwiched between an inner, current-conducting transparent lamina and an outer, opaque current-conducting lamina with a protective coating over the outer lamina. The electroluminescent light source is provided with suitable openings therein for protrusion of the tungsten lamps therethrough, as shown in Figs. 5 and 6. The frame members are provided with vent openings 64 for circulation of air therethrough so as to dissipate heat thrown off by the light sources.

Referring still to Figs. 4-6, for ship installations, the light-transmitting panel 40 is provided with a cylindrical recess 66 in its front in the upper right hand corner (Fig. 4), in which recess is mounted a circular dial 68. The surfaces of the cylindrical recess and the surfaces of the dial (Fig. 5) are polished for efficient transmission of light therethrough, and the dial is flush with the front surface of the panel. The dial, which is fabricated of transparent light-transmitting plastic, is mounted for rotation on a shaft 70, which shaft is rotated by a synchro motor 71. The motor is mounted on the rear frame member by a bracket 72 attached to the frame by a pair of studs 73. As shown, the dial is formed with a cross pointer 74 (Fig. 4) thereon and with graduations around its periphery. The adjacent surface of the panel is provided with like graduations at 15° intervals and marked 000—030—060, etc. The purpose of the dial, as will be described hereinafter, is to indicate the ship's course; a reference course referred to hereinafter as Own Ships Course or O.S.C. For land installations, the dial may be omitted.

Referring again to the light-transmitting panel 40, and with reference to Fig. 4, the back or reverse surface of panel 40 is formed with polar co-ordinate markings comprising range rings 80 and solid and dashed bearing lines 82a and 82b. The range rings are arranged as concentric circles and are a fixed distance apart. The solid bearing lines are 30° apart and are so marked. The dashed bearing lines interpolate every ten degrees between the solid bearing lines and are so marked. The polar co-ordinate markings including the numerals are applied to the back of the panel by a silk screening process, known in the art. Preferably all range circles, bearing lines and numerals on the back of the principal panel 40 are green in color and are permanent. The bearings, markings and numerals around the circumference of the O.S.C. dial 68 are painted on the back of the principal panel and are orange in color. The bearing lines and the cross pointer for the O.S.C. dial are painted on the back of such dial and are orange in color. All plotting, range, bearing and identification markings are inscribed on the back of the panel, backwards, so that such markings may be read correctly from the front.

The temporary or movable markings, used for plotting, are also applied to the back of the panel and viewed from the front. Three such plotting markings indicated at X, Y and Z, are shown and may be made by erasable grease pencils, pressure-sensitive adhesive tabs, small vacuum cups, or the like, and because of the substantially white light introduced into the panel by the combination of electroluminescent and tungsten filament light sources, these markings, which are of diffuse material, may be of any color within the visible spectrum.

In Fig. 7 there is shown a schematic wiring diagram for the tungsten lamps, the electroluminescent light source and for the synchro motor. Referring now to Fig. 7, the tungsten filament lamps 52 are connected in parallel by conductors 53 on one circuit and energized by a 115 v./7 v. transformer 86. An "on-off" snap switch 88 located on the front of the central box is provided in the 115 v. circuit energizing the transformer. The illumination intensity of the tungsten lamps is controlled by a variable rheostat 90 located in the control box (Fig. 4). A like circuit is provided for the electroluminescent light source 14. That is, the electroluminescent light source is energized by a special characteristic, 115 v./250 v., transformer 92, having a snap switch 94 and a variable rheostat 96 in the 115 v. transformer circuit.

The circuits shown in Fig. 7 for the plotting board illustrated in Figs. 4–6 may be used with the other illustrated embodiments of the invention. That is: when the red end of the range of the visible spectrum is required, only the tungsten filament light source is energized and this source may be dimmed as desired; when the blue-violet end of the range of the visible spectrum is required, only the electroluminescent source is energized and this source may be dimmed as desired; and when the entire range of the visible spectrum is required, both light sources are energized and may be dimmed as desired. Thus, with the instant invention, any or all of the principal colors, red, orange, yellow, green, blue and violet, of the visible spectrum may be taken from the light-transmitting panel and used as desired. Also, these colors may be dimmed without losing their distinctiveness and, in fact, many distinctive shades of the principal colors may be taken from the light-transmitting panel.

As pointed out hereinbefore, the electroluminescent light source may or may not, as desired, be placed in optical contact with the light-transmitting panel. In certain installations it is desirable that the electroluminescent light source be readily removable from the panel, in which case optical contact would not be provided between the transparent conductor and the adjacent surface of the light-transmitting panel by the mere interface relation of such surfaces. Where desired, certain advantages of optical contact may be attained by providing light diffusing characteristics to the surfaces of the light transmitting panel in those areas that intercept light from the electroluminescent light source. These diffusing characteristics may be provided by roughening the surfaces of the light-transmitting panel which are adjacent the electroluminescent light source and by applying a diffusing surface to the opposite or light reflecting surface of the light-transmitting panel. Where optical contact is provided light can be regarded as originating under the principal surfaces of the light-transmitting panel and roughening is of less utility.

Having thus described the invention, it is to be understood that the foregoing disclosure relates to only preferred embodiments of the invention and that numerous modifications or alterations may be made therein without departing from the spirit and the scope of the invention as set forth in the appended claims.

What is claimed is:

1. An illumination system comprising a first panel of transparent light-transmitting material having substantially parallel front and rear surfaces operative to specularly reflect light rays therebetween, an electroluminescent light source of substantially U-shaped cross section positioned around the periphery of said panel for introducing light rays into said panel for transillumination thereof whereby said panel is framed by said electroluminescent source, a tungsten filament light source for introducing light rays into said panel for transillumination thereof, and light intercepting means on a surface of said first panel for intercepting light rays passing through the panel and reflecting such rays out of the panel.

2. The invention as defined in claim 1 and further comprising a second panel positioned adjacent the front surface of the first panel and optically separated therefrom, and indicia forming means on said second panel in line with said light intercepting means.

References Cited in the file of this patent

UNITED STATES PATENTS

| | | |
|---|---|---|
| 2,725,461 | Amour | Nov. 29, 1955 |
| 2,772,496 | Meyrick et al. | Dec. 4, 1956 |
| 2,791,050 | Neugass | May 7, 1957 |
| 2,821,800 | Hardesty | Feb. 4, 1958 |
| 2,831,966 | Porteous | Apr. 22, 1958 |
| 2,836,707 | Stitt | May 27, 1958 |
| 2,855,709 | Roper | Oct. 14, 1958 |
| 2,858,632 | Caserio et al. | Nov. 4, 1958 |
| 2,860,234 | Stevens | Nov. 11, 1958 |
| 2,872,567 | Strange | Feb. 3, 1959 |